United States Patent
Forte (10) Patent No.: US 9,143,512 B2
(45) Date of Patent: Sep. 22, 2015

(54) COMMUNICATION DEVICES, COMPUTER READABLE STORAGE DEVICES, AND METHODS FOR SECURE MULTI-PATH COMMUNICATION

(71) Applicant: AT&T Intellectual Property I, L.P., Atlanta, GA (US)

(72) Inventor: Andrea Forte, Brooklyn, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/046,220

(22) Filed: Oct. 4, 2013

(65) Prior Publication Data

US 2015/0101018 A1 Apr. 9, 2015

(51) Int. Cl.
*H04L 29/00* (2006.01)
*H04L 29/06* (2006.01)

(52) U.S. Cl.
CPC ...................................... *H04L 63/10* (2013.01)

(58) Field of Classification Search
USPC ....................................................... 726/2–10
See application file for complete search history.

(56) References Cited

U.S. PATENT DOCUMENTS

| | | | |
|---|---|---|---|
| 7,116,679 B1 | 10/2006 | Ghahremani | |
| 7,184,767 B2 | 2/2007 | Gandolfo | |
| 7,224,964 B2 | 5/2007 | Souissi et al. | |
| 7,231,430 B2 | 6/2007 | Brownell et al. | |
| 7,447,149 B1 | 11/2008 | Beesley et al. | |
| 7,599,323 B2 | 10/2009 | Chandranmenon et al. | |
| 7,647,048 B2 | 1/2010 | Brok et al. | |
| 7,853,265 B1 | 12/2010 | Ahmad | |
| 7,882,247 B2 | 2/2011 | Sturniolo et al. | |
| 7,974,279 B2 | 7/2011 | Kambhampati et al. | |
| 8,041,360 B2 | 10/2011 | Ibe et al. | |
| 8,104,082 B2 | 1/2012 | McAlister | |
| 8,238,326 B2 | 8/2012 | Kant et al. | |
| 8,402,530 B2 | 3/2013 | Anderson et al. | |
| 8,413,224 B2 | 4/2013 | Hagg et al. | |
| 8,429,294 B2 | 4/2013 | Bachmann et al. | |
| 2007/0289009 A1 | 12/2007 | Phan-Anh | |
| 2010/0306540 A1* | 12/2010 | Yamada et al. | ............... 713/168 |
| 2012/0239744 A1 | 9/2012 | Yonge, III et al. | |

OTHER PUBLICATIONS

Chen et al. "Identifying Mobiles Hiding behind Wireless Routers", INFOCOM, Proceedings IEEE, 2651-2659 (2011).
Gundavelli et al. "Proxy Mobile IPv6", http://www.hjp.at/doc/rfc/rfc5213.html (Aug. 2008).

* cited by examiner

*Primary Examiner* — Ghazal Shehni
(74) *Attorney, Agent, or Firm* — Gardner Groff Greenwald & Villanueva, P.C.

(57) ABSTRACT

A message is divided into multiple message segments, and a network interface is selected from among a plurality of different types of network interfaces included within a communication device for transmitting each message segment. Each network interface is dedicated to a different type of communication protocol using a different encryption technique, and a network interface is selected for transmitting each message segment according to a pattern of the network interfaces. Secure transmission of the multiple message segments is initiated via the network interfaces according to the pattern.

20 Claims, 6 Drawing Sheets

COMMUNICATION DEVICES, COMPUTER READABLE STORAGE DEVICES, AND METHODS FOR SECURE MULTI-PATH COMMUNICATION

TECHNICAL FIELD

The present disclosure relates generally to communication and, more particularly to secure, multi-path communications.

BACKGROUND

Mobile computing, wireless networks, wireline networks, and the Internet have become convergent and pervasive. Modern communication devices, such as cellular phones as tablets, typically have multiple network interfaces capable of communicating with the Internet.

WiFi networks, in particular, have become increasingly popular for connecting to the Internet because they allow a communication device to connect wirelessly. Also, WiFi networks are typically easy to use and are not prohibitively expensive. However, the pervasive deployment of WiFi has provided an easy target for cyber criminals and hackers.

Other networks that connect to the Internet, e.g., cellular networks and wireline networks, are also subject to attack from hackers. While there have been efforts to prevent cyber attacks, e.g., encryption, such efforts are not fail-proof. If a cyber-attacker wants to "sniff" network traffic, he or she need only break the encryption for the network.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a communication device includes a processor and a memory having instructions stored thereon which, when executed by the processor, cause the processor to perform operations. The operations include dividing a message into multiple message segments, and selecting a network interface, among a plurality of different types of network interfaces included within the communication device, for transmitting each message segment. Each network interface is dedicated to a different type of communication protocol using a different encryption technique. A network interface is selected for transmitting each message segment according to a pattern of the network interfaces, and secure transmission of the multiple message segments is initiated via the network interfaces according to the pattern.

According to another embodiment, a computer readable storage device included within a communication device has instructions stored thereon which, when executed by a processor, cause the processor to perform operations. The operations comprise dividing a message into multiple message segments and selecting a network interface among a plurality of different types of network interfaces included within the communication device for transmitting each message segment. Each network interface is dedicated to a different type of communication protocol using a different encryption technique. A network interface is selected for transmitting each message segment according to a pattern of the network interfaces, and secure transmission of the multiple message segments is initiated via the network interfaces according to the pattern.

According to another embodiment a method comprises dividing a message into multiple message segments and selecting a network interface among a plurality of different types of network interfaces included within a communication device for transmitting each message segment. Each network interface is dedicated to a different type of communication protocol using a different encryption technique, and a network interface is selected for transmitting each message segment according to a pattern of the network interfaces. Secure transmission of the multiple message segments is initiated via the network interfaces according to the pattern.

DETAILED DESCRIPTION

Detailed illustrative embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1A:
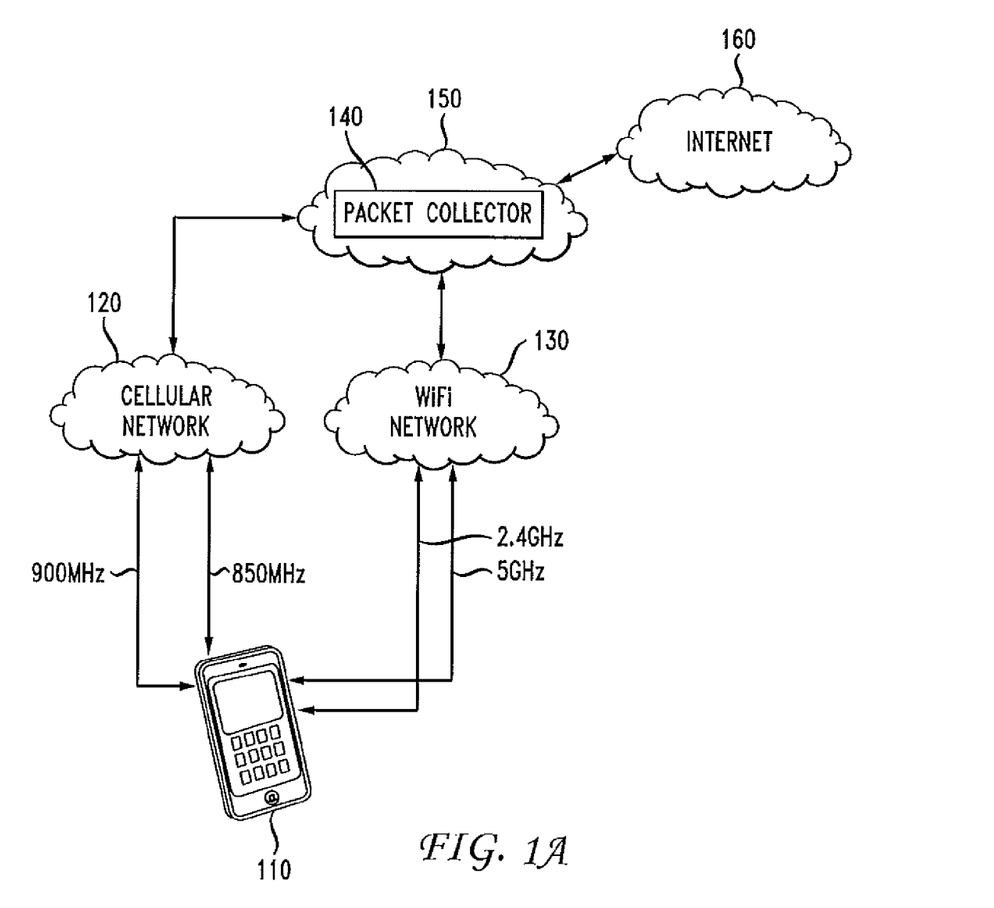
FIG. 1A illustrates an environment in which a communication device including multiple network interfaces may be used to securely transmit and receive messages according to one embodiment.

Referring now to the figures, FIG. 1A illustrates an environment in which a communication device including multiple network interfaces may be used to securely transmit and receive messages according to one embodiment. As shown in FIG. 1A, a communication device 110, such as a mobile phone, transmits and receives messages to and from a cellular network 120 and a WiFi network 130. The cellular network 120 and the WiFi network 130, in turn, communicate with the Internet 160 via a network 150 including a packet collector 140. This is described in more detail below.

According to illustrative embodiments, the cellular network 120 network operates according a protocol dictated by telecommunications standards, such as Global System for Mobile communications (GSM) and a Universal Mobile Telecommunications System (UMTS). The WiFi network 130 may operate according to a protocol dictated by the IEE 802.11 telecommunication standard. It should be understood, however, that the networks 120 and 130 may be implemented using wireless networks that use any existing or yet to be developed telecommunications technology. For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Referring again to FIG. 1A, the communication device 110 has multiple network interfaces for communicating with the cellular network 120, the WiFi network 130, and with other devices. For communicating with the cellular network 120, the communication device 110 includes, for example, interfaces for communicating via multiple standards, including but not limited to the GSM standard (over the 900 MHz frequency band) and the UMTS standard (over the 850 MHz frequency band). The communication device 110 also includes multiple interfaces for communicating with the WiFi network 130. These interfaces may include interfaces for communicating according to the IEE 802.11 standard (over, for example, the 2.4 GHz frequency band on Channels 1, 2, 6, etc. and the 5 GHz frequency band on Channels 48, 50, etc.). Although not shown in FIG. 1A for simplicity of illustration, it should be appreciated that the communication device 110 also includes additional interfaces for communicating with other communication devices using, e.g., Bluetooth or Near Field Communications (NFC) connections. This is described in more detail with reference to FIG. 1B.

The different communication standards according to which the communication device 110 communicates with different networks dictate the use of different encryption techniques. According to illustrative embodiments, the multiple network interfaces of the communication device 110 that are utilized for communicating are leveraged to improve security. In particular, message segments are transmitted and received via the multiple network interfaces using different encryption technologies in such a way that it makes it difficult for an attacker intercept or otherwise interact undesirably with (e.g., "sniff") messages.

According to an illustrative embodiment, in preparation for sending a message, the communication device 110 divides the message into multiple message segments or packets. The communication device 110 selects a network interface, among the multiple network interfaces, for transmitting each message segment. The network interfaces are selected in a particular order according to a pattern, e.g., a pattern of network interface identifiers. The pattern may be random or may include a specific sequence of network interfaces. The pattern of network interfaces may be set so that each interface transmits one segment, each interface transmits segments for a certain amount of time, or each interface transmits a certain number of segments before a transition is made to the next interface in the pattern. The communication device 110 sends the multiple message segments to the packet collector 140 via the network interfaces and the cellular network 120 and the WiFi network 130 according to the pattern.

The packet collector 140 receives the multiple segments and arranges them according to the pattern. For example, if the pattern is random, each segment may include a sequence number (which may be protocol dependent). The packet collector 140 arranges the randomly transmitted segments according to the sequence number of each segment. As another example, the packet collector 140 and the communication device 110 may negotiate the pattern in which segments are sent via the network interfaces either in real time or before the message segments are sent, such that the packet collector 110 knows how to arrange the received messages segments into a single message. This negotiation may occur on a privilege channel. The communication device 110 may also send a specific sequence of signals that triggers a changing of the pattern in which the network interfaces are used to send message segments. As yet another alternative, the pattern may be pre-provisioned on the communication device 110 and may be communicated to the packet collector 140. As still another alternative the pattern may be pre-provisioned on the communication device, and the packet collector 140 may infer the pattern based on the sequence of the received segments.

As shown in FIG. 1A, the packet collector 140 is included in a network 150, which may be part of a cloud computing network. The packet collector 140 sends the message assembled from the segments received from the communication device 110 to the Internet 160. The assembled message may, in turn, be distributed to other communication devices (not shown) by the Internet 160. Alternatively, the network 150 may be included as part of the Internet 160.

In addition to being able to send a message as multiple message segments, the communication device 110 is able to receive message segments via the multiple network interfaces and assemble them into a single message. Referring again to FIG. 1A, a message from the Internet 160 is divided into multiple segments or packets by the packet collector 140 in the network 150. The packet collector 140 divides the message according to a pattern that the communication device 110 uses in selecting network interfaces for receiving message segments. This pattern may be the same as or different from the pattern used for selecting network interfaces for transmitting message segments and may be made known to the packet collector 140 in a manner similar to that described above. The packet collector 140 sends the message segments over the cellular network 120 and the WiFi network 130. The communication device 110, in turn, receives the multiple message segments via the multiple communication interfaces and assembles the segments into a single message according to the pattern.

The communication device 110 may be implemented as a mobile communication device including multiple communication interfaces, such as the device 200 described in detail below with reference to FIG. 2. The packet collector 140 may be implemented with a computing device, such as that shown in FIG. 3.

Figure 1B:
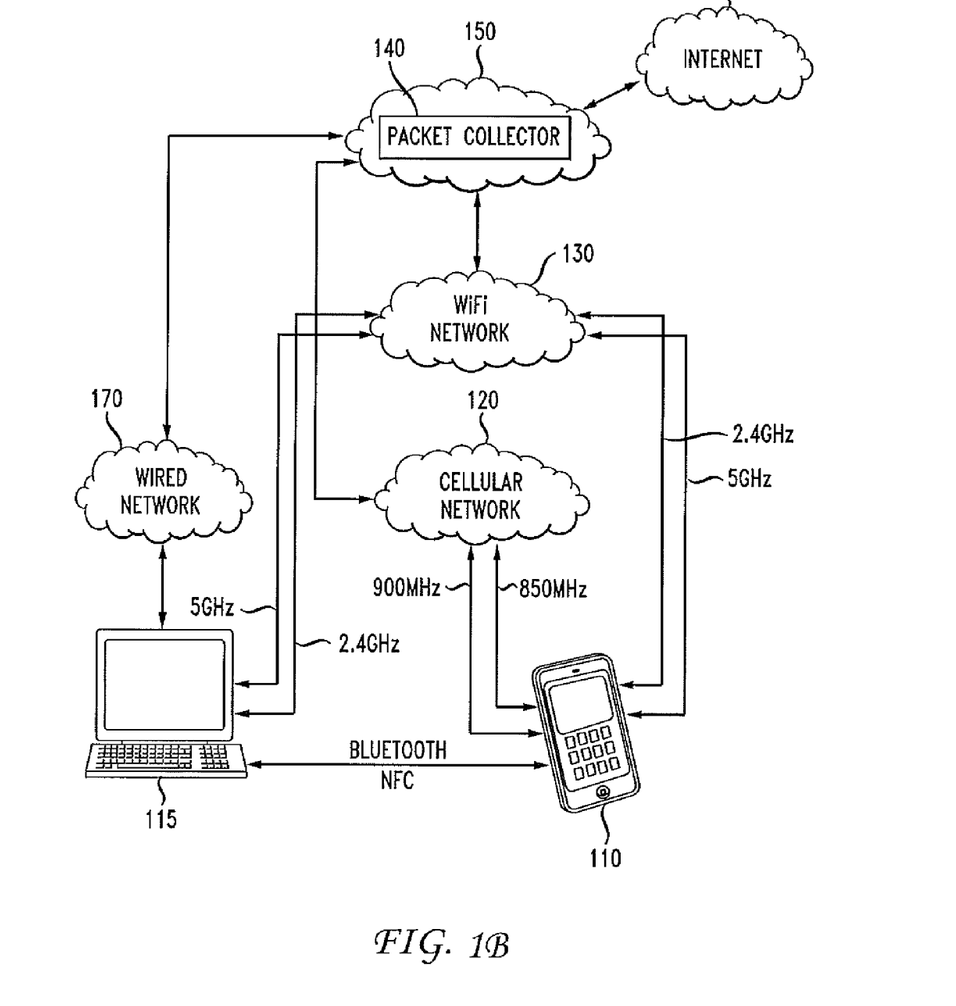
FIG. 1B illustrates an environment in which multiple communication devices with multiple network interfaces may be used to securely transmit and receive messages according to another embodiment.

FIG. 1B illustrates an environment in which multiple communication devices with multiple network interfaces may be used to securely transmit and receive messages according to another embodiment. As shown in FIG. 1B, the communication device 110 is in communication with another communication device 115 via, e.g., a Bluetooth and/or NFC connection. The communication device 115 may be implemented with a personal computing device or other communication device that is similar to the device 110 but that has different communication interfaces. For example, the communication device 115 may be a laptop or any other device that has Ethernet interfaces but no cellular network interfaces.

Both communication devices 110 and 115 have multiple network interfaces to the WiFi network 130, as well as interfaces to communicate with each other. However, as mentioned above, the communication device 115 does not have interfaces for communicating with the cellular network 120. Rather, the communication device 115 has an interface for communicating with a wired network 170 via, e.g., an Ethernet connection, operating according to a protocol dictated by the IEEE 802.03 standard. The wired network 170, like the WiFi network 120 and the cellular network 130, uses encryption techniques that are unique to the standard according to which it operates.

The communication device 115 may divide a message into message segments according to a pattern in a manner similar to that described above. The pattern may be random or may include a specific sequence of network interfaces. The pattern of network interfaces may be set so that each interface transmits one segment, each interface transmits segments for a certain amount of time, or each interface transmits a certain number of segments before a transition is made to the next interface in the pattern. The pattern may also be pre-provisioned or negotiated with the packet collector 140 in a manner similar to that described above.

According to an illustrative embodiment, the communication device 115 sends some segments to the wired network 170 via the Ethernet interface and sends other segments to the WiFi network 130 via the WiFi interfaces based on the pattern. To leverage the additional cellular network interfaces of the communication device 110, other message segments may be sent to the communication device 110 via a Bluetooth/NFC connection according to the pattern used by the communication device for selecting network interfaces. The communication device 110 may, in turn, transmit the segments to the cellular network 120 via the cellular network interfaces available to the communication device 110. The communication device 110 may also transmit some segments to the WiFi network 130, depending upon the pattern of network interfaces used by the communication device 115.

Similarly, the communication device 110 may leverage the wired interface available to the communication device 115 by sending some message segments to the cellular network 120, sending other message segments to the WiFi network 130, and sending the remaining message segments to the communication device 115 via the Bluetooth/NFC connection according to the pattern used by the communication device 110 used in selecting network interfaces. The communication device 115 may, in turn, send the remaining message segments via the Ethernet interface to the wired network 170. The communication device 115 may also transmit some segments received from the communication device 110 to the WiFi network 130, depending upon the pattern of network interfaces used by the communication device 110.

According to yet another embodiment, the communication device 115 may use a pattern for sending some message segments, and the communication device 110 may use another pattern for sending other message segments. For example, the communication device 115 may transmit some message segments to the packet collector 140 via the wired network 170 and the WiFi network 130 and transmit remaining message segments to the communication device 110, according to a pattern. The communication device 110, in turn, may use a different pattern for transmitting the remaining message segments to the packet collector 140 via the cellular network 120 and/or the WiFi network 130. Similarly, the communication device 110 may transmit some message segments to the packet collector 140 via the cellular network 120 and the WiFi network 130 and transmit remaining message segments to the communication device 115, according to a pattern. The communication device 115, in turn, may use a different pattern for transmitting the remaining message segments to the packet collector 140 via the wired network 170 and/or the WiFi network 130. In this case, the packet collector 140 is made aware of both patterns, e.g., in advance or by negotiation.

The packet collector 140 shown in FIG. 1B receives the segments from the communication device 115 and the communication device 110 and assembles the segments into a message according to a pattern (or patterns) in a manner similar to that described above with regard to FIG. 1A. The message may then be provided, e.g., to the Internet 160.

Similarly, the packet collector 140 shown in FIG. 1B receives a message from, e.g., the Internet 160, divides the message into segments, and sends the segments to the communication device 115 and the communication device 110 according to a pattern (or patterns) in a manner similar to that described above.

According to illustrative embodiments, if the message from the packet collector 140 is addressed to the communication device 115, then segments received at the communication device 110 from the packet collector 140 are sent to the communication device 115 via the Bluetooth/NFC connection, and the communication device 115 assembles the message. If the message from the packet collector 140 is addressed to the communication device 110, then the segments received at the communication device 115 from the packet collector 140 are sent to the communication device 110 via the Bluetooth/NFC connection, and the communication device 110 assembles the message. It should be appreciated, however, that some assembly of message segments may occur at one of the devices 110 and 115, though the message is addressed to the other device.

Figure 2:
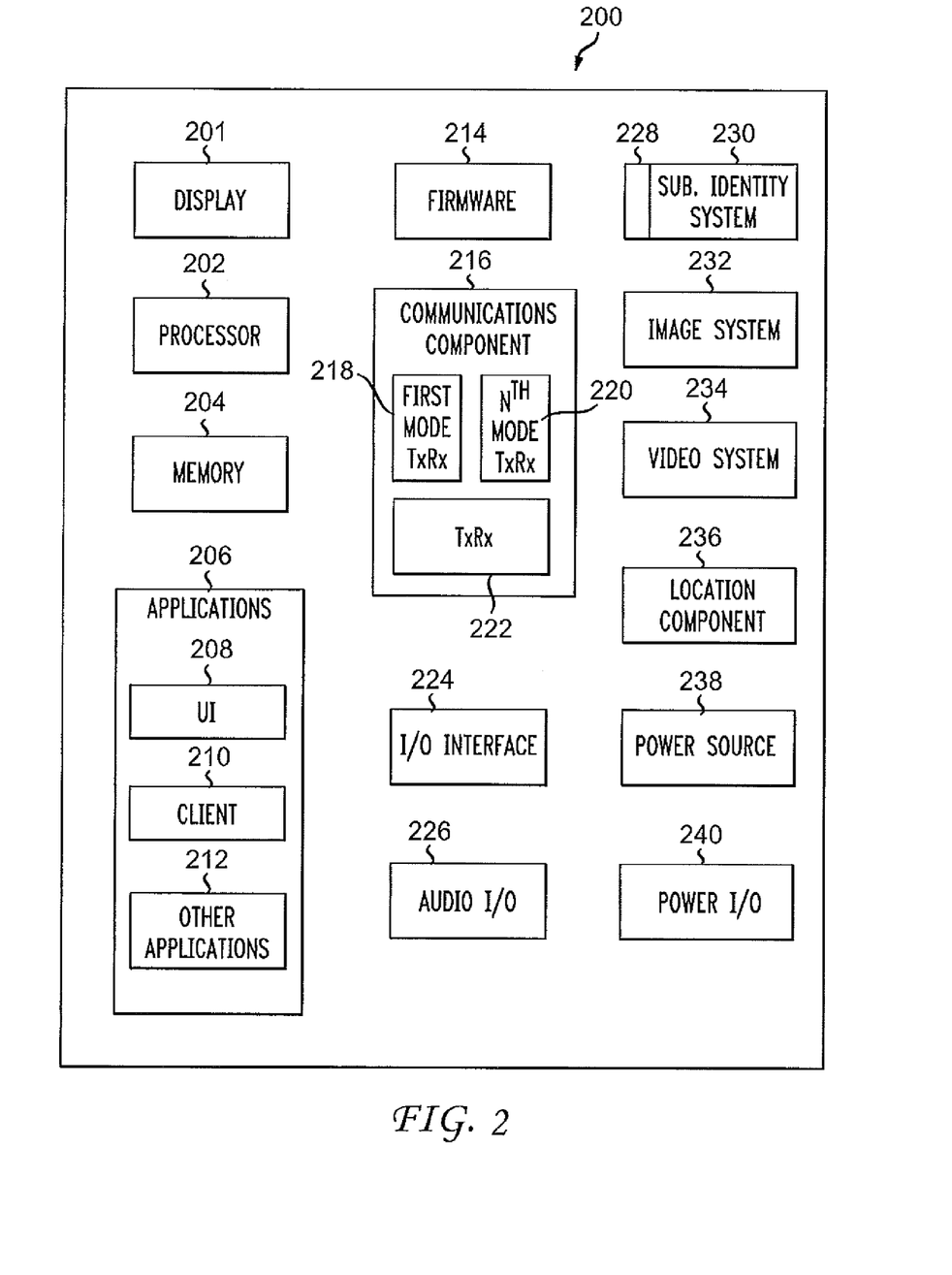
FIG. 2 illustrates details of a communication device according to an illustrative embodiment.
Figure 3:
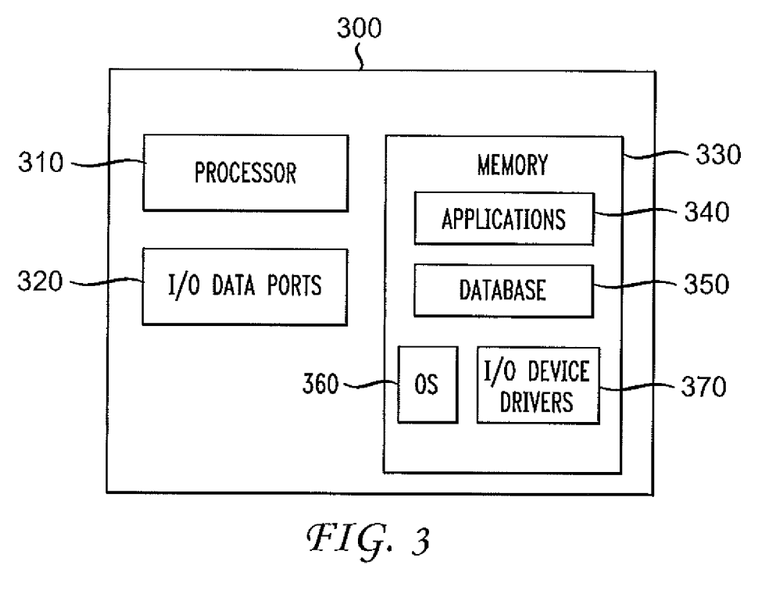
FIG. 3 illustrates details of a packet collector according to an illustrative embodiment.

Although two communication devices 110 and 115 having different communication interfaces are shown in FIG. 1B for illustrative purposes, it should be appreciated that any number of communication devices having any sort of communication interfaces with which data may be exchanged with the packet collector 140 may be implemented in the manner set forth in this disclosure FIG. 2 illustrates a schematic block diagram of a communication device with which the communication device 110 may be implemented, and FIG. 3 illustrates a block diagram of a computing system with which the packet collector 140 may be implemented, according to illustrative embodiments. Although no connections are shown between the components illustrated in FIGS. 2 and 3, those skilled in the art will appreciate that the components can interact with each other via any suitable connections to carry out device functions.

It should be understood that FIGS. 2 and 3 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the devices shown in FIGS. 2 and 3.

Referring to FIG. 2, a communication device 200 may be a multimode handset and can include a variety of computer-readable media. The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like.

The device 200 may include a processor 202 for controlling and/or processing data. A memory 204 can interface with the processor 202 for the storage of data and/or applications 206. Data stored in the memory 204 may include a pattern used for selecting network interfaces for transmitting message segments. An additional pattern may be stored in the memory 204 for assembling message segments received via multiple network interfaces. It should be appreciated that more than one pattern may be stored for selecting network interfaces for transmitting message segments and/or assembling message segments received via multiple network interfaces, and that the patterns may be switched periodically or randomly to improve security. Transition to a new pattern may be signaled to the packet collector 140 as described above with reference to FIG. 1A.

The applications 206 may include, for example, an electronic mail client, SMS messaging software, EMS message software, MMS messaging software, USSD software, a WAP browser, and the like.

The applications 206 may also include a user interface (UI) application 208. The UI application 208 can interact with a client 210 (e.g., an operating system) to facilitate user interaction with device functionality and data. For example, the UI application 208 may be used for entering message content, viewing received messages, answering/initiating calls, entering/deleting data, password entry and settings, configuring settings, address book manipulation, and the like. Such user interaction may be facilitated via, e.g., a keypad or a touchscreen included in the device 200 or communicating with the device via the I/O interface 224.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components.

According to illustrative embodiments, the applications 206 may also include an application for dividing a message into multiple segments and selecting different network interfaces for sending the message segments according to a pattern. The applications may also include an application for assembling received message segments according to the pattern used for transmitting segments or a different pattern. The applications 206 may further include an application for negotiating with the packet collector 140 to determine the pattern for selecting network interfaces.

The applications 206 can be stored in the memory 204 and/or in firmware components 214 and can be executed by the processor 202. The firmware 214 can also store code for execution during initialization of the device 200.

A communications component 216 may interface with the processor 202 to facilitate wired/wireless communication with external systems and devices including, for example, cellular networks, location systems, VoIP networks, local area networks (LAN's), wide area networks (WAN's), metropolitan area networks (MAN's), personal area networks (PAN's), the Internet, and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. While only one transceiver 222 for simplicity of illustration, it should be appreciated that multiple transceivers, dedicated to different communication technologies, may be used. The communications components 216 may also facilitate reception from terrestrial radio networks, digital satellite radio networks, Internet based radio service networks, combinations thereof, and the like.

The communications component 216 can be used to communicate with the packet collector 140 via the cellular network 120 and/or the WiFi network 130. Also the communications component 216 may be used to receive messages from the communication devices 115.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, and satellites, location transmitters and/or beacons, wireless network transmitters and receivers, for example, WiFi hotspots, radio transmitters, combinations thereof and the like. The device 200 may obtain, generate, and/or receive data to identify its location or can transmit data used by other devices to determine the device location.

The device 200 may also include a power source 238, such as batteries and/or other power subsystems (AC or DC). The power source 238 can interface with an exemplary power system or charging equipment via a power I/O component 240.

Although not illustrated, it should be appreciated that the communication device 115 may contain components similar to those illustrated and described above with regard to FIG. 2. One difference between the communication device 115 and the device 200 may be that the communication device 115 contains a wired network interface instead of cellular network transceivers.

FIG. 3 is a block diagram of a computing device 300 with which the packet collector 140 shown in FIGS. 1A and 1B may be implemented. According to an illustrative embodiment, the computing device 300 may be implemented in any suitable computing device and on any suitable network. According to an exemplary embodiment, the computing device 300 may be implemented as a server in a cloud computing network 150 in communication with the Internet 160.

Referring to FIG. 3, the computing device 300 includes a processor 310 that receives message segments from communication devices 110 and 115 via I/O Data Ports. The processor 310 assembles the message segments into a message according to the pattern used for transmitting the message segments. The processor 310 transmits an assembled message via the I/O Data Ports 320. Similarly, the processor 310 receives a message via the I/O Data Ports 320, divides the message into message segments, and sends the message segments to communication devices via the I/O Data Ports 320. The I/O Data Ports 320 can be implemented with, e.g., an interface including an antenna or other suitable type of transceiver through which data and signals may be transmitted and received wired and/or wirelessly.

The computing device 300 also includes a physical hard drive 380. The processor 310 communicates with the memory 330 and the hard drive 380 via, e.g., an address/data bus (not shown). The processor 310 can be any commercially available or custom microprocessor. The memory is 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, and input/output (I/O) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310. The applications 340 include various programs that implement the various features of the device 300. The applications 340 may include an application for dividing a received message into message segments and assembling received message segments according to a pattern. The applications 340 may also include an application for negotiating a pattern with the communication devices 110 and 115 for selecting user interfaces to transmit/receive message segments.

The database 350 represents the static and dynamic data used by the applications 340, the OS 360, the I/O device drivers 370 and other software programs that may reside in the memory. The database may 350 may be used to store the pattern(s) used by the communication devices 110 and 115 for selecting network interfaces for transmitting/receiving message segments.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

FIGS. 4-7 illustrate various methods for communicating according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Figure 4:
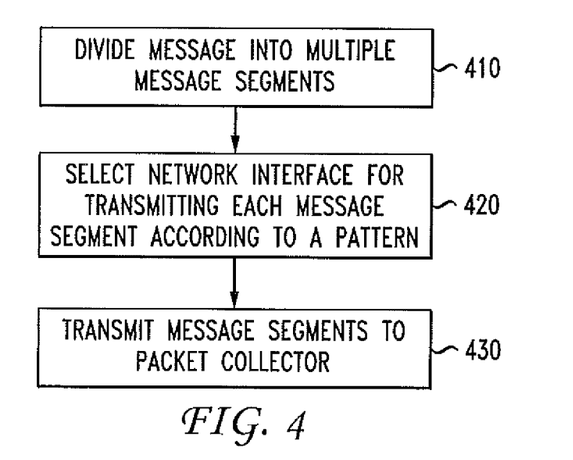
FIG. 4 illustrates a method for sending messages from a communication device via multiple network interfaces according to illustrative embodiments.

FIG. 4 illustrates a method for sending segments from a communication device to a packet collector according to illustrative embodiments. Referring to FIG. 4, a message is divided into multiple segments by the communication device at which the message originates, e.g., communication device 110 or 115, at step 410. At step 420, a network interface for transmitting each message segment is selected according to a pattern. According to an illustrative embodiment, if the communication device 110 divides the message into multiple segments, the communication device 110 selects the network interfaces for transmitting each message segment. The network interfaces selected may include those associated with the communication device 110 as well as those associated with another communication device in communication with the communication device, e.g., the communication device 115. If the communication device 115 divides the message into multiple segments, the communication device 115 selects the network interfaces for transmitting each message segment. The network interfaces selected may include those associated with the communication device 115 and those associated with another communication device in communication with the communication device 115, e.g., the communication device 110. The network interfaces are selected according to a pattern (or patterns). At step 430, the message segments are transmitted from the communication device 110 and/or the communication device 115 via the various network interfaces to the packet collector 140. The message segments may be transmitted at the same time or at different times.

Figure 5:
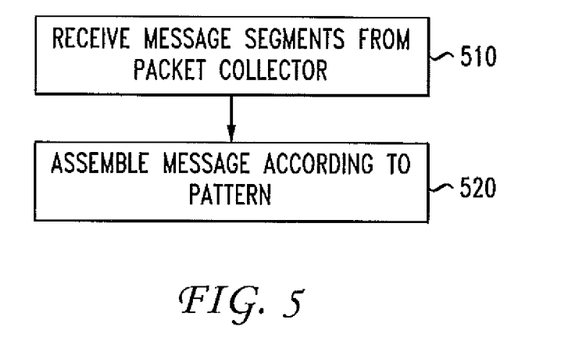
FIG. 5 illustrates a method for receiving messages by a communication device via multiple network interfaces according to illustrative embodiments.

FIG. 5 illustrates a method for receiving message segments from a packet collector by a communication device according to illustrative embodiments. Referring to FIG. 5, message segments are received from the packet collector 150 at the communication device 110 and/or 115. The message segments are received via a combination of, e.g., the cellular network 120, the WiFi network 130, and/or the wired network 140. If message segments addressed to the communication device 115 are received by the communication device 110, those message segments are sent to the communication device 115 from the communication device 110. Likewise, if message segments addressed to the communication device 110 are received by the communication device 115, those message segments are sent to the communication device 110. According to an illustrative embodiment, the communication device to which the message segments are addressed assembles the message segments according to a pattern. As described above, for example, the message segments may each include sequence numbers, in which case the communication device assembles the message segments in order according to the sequence number. As an alternative, the pattern may be preprovisioned on the communication device (such that it is known in advance to the packet collector 140), or it may be negotiated with the packet collector 140.

Figure 6:
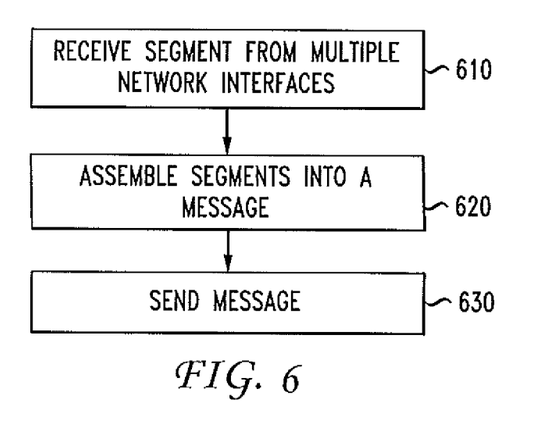
FIG. 6 illustrates a method for receiving a message by a packet collector according to illustrative embodiments.

FIG. 6 illustrates a method for assembling message segments received by a packet collector from a communication device according to illustrative embodiments. Referring to FIG. 6, at step 610, the packet collector 140 receives message segments transmitted via multiple network interfaces, e.g., from communication devices 110 and 115. The segments may be received at the same time or at different times. At step 620, the packet collector 140 assembles the message segments into a message. In one embodiment, the packet collector 140 assembles the segments according to the pattern in which the network interfaces were selected for transmitting the message segments. For example, if the pattern is random, each segment or packet may contain a sequence number, in which case the packet collector 140 assembles the packets in order according to the sequence number. As an alternative, the pattern used in the selection of the network interfaces may negotiated between the communication devices 110 and/or 115 and the packet collector 140, or the pattern may be pre-provisioned such that the packet collector 140 knows the pattern in advance. Once the message is assembled, the packet collector 140 sends the message via, e.g., the Internet 160, at step 630.

Figure 7:
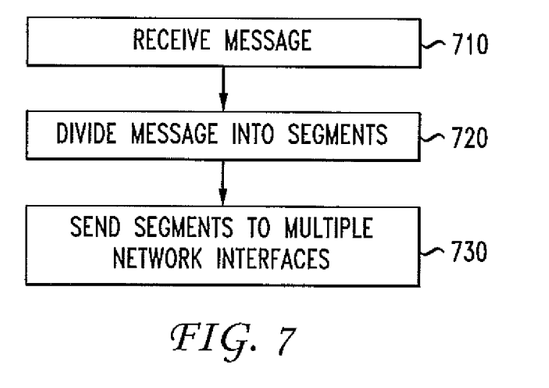
FIG. 7 illustrates a method for sending a message by a packet collector according to illustrative embodiments.

FIG. 7 illustrates a method for sending message segments from a packet collector to communication devices according to illustrative embodiments. At step 710, the packet collector 140 receives a message, e.g., the Internet 160. At step 720, the packet collector divides the message into message segments. At step 730, the message segments are each sent to a network interface of the communication device 110 and/or 115 according to a pattern or patterns (which may be pre-provisioned or negotiated as described above).

According to the exemplary embodiments described above, a pattern of network interfaces may include network interface identifiers that indicate a sequence or order in which network interfaces should be selected for communicating message segments. It should be appreciated that, in some embodiments, the pattern may also include device identifiers together with network interface identifiers. In other embodiments, it may not matter to the packet collector 140 whether message segments are received or addressed to a particular communication device.

In still other embodiments, the packet collector 140 may apply different rules depending on what communication device a network interface belongs to. For example, the packet collector 140 may deal with a virtual communication device, which includes all the network interfaces from, e.g., communication devices 110 and 115. In such a case, it would not matter which network interface corresponds to which device. On the other hand, if one communication device is less trusted by a user, the packet collector 140 may use a pattern for communicating message segments so that the network interfaces of the less trusted communication device are used less frequently or in a way so as to prevent reassembly of meaningful parts of a message by the less trusted communication device.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A communication device, comprising:
   a processor; and
   a memory having instructions stored thereon which, when executed by the processor, cause the processor to perform operations comprising:
   dividing a message into multiple message segments;
   selecting a respective network interface, from among a plurality of different types of network interfaces included within the communication device, for transmitting each respective message segment of the multiple message segments according to a pattern of the plurality of different types of network interfaces, wherein each network interface of the plurality of different types of network interfaces is dedicated to a different type of communication protocol using a different encryption technique; and
   initiating secure transmission of each respective message segment via the respective network interface selected for transmitting that respective message segment according to the pattern.

2. The communication device of claim 1, wherein an additional network interface is included in another communication device in communication with the communication device, and wherein selecting the respective network interface comprises selecting the respective network interface from among the plurality of different types of network interfaces included within the communication device and the additional network interface included within the other communication device according to the pattern.

3. The communication device of claim 2, wherein the additional network interface included in the other communication device is dedicated to another type of communication protocol using a another encryption technique, wherein the other type of communication protocol and the other encryption technique are different than the type of communication protocol and the encryption technique to which each network interface included in the communication device is dedicated.

4. The communication device of claim 1, wherein the pattern is random, such that the respective network interface selected for transmitting each respective message segment is randomly selected.

5. The communication device of claim 1, wherein the pattern is a particular sequence, and the respective network interface selected for transmitting each respective message segment is selected in a particular order according to the particular sequence.

6. The communication device of claim 1, wherein there are multiple patterns of the plurality of different types of network interfaces, and the instructions further cause the processor to choose the pattern according to which the respective network interface for transmitting each respective message segment is selected from among the multiple patterns.

7. The communication device of claim 1, wherein the pattern according to which the respective network interface for transmitting each respective message segment is selected is negotiated with a server that receives each respective message segment.

8. A computer readable storage device included within a communication device and having instructions stored thereon which, when executed by a processor, cause the processor to perform operations comprising:
dividing a message into multiple message segments;
selecting a respective network interface from among a plurality of different types of network interfaces included within the communication device for transmitting each respective message segment of the multiple message segments according to a pattern of the plurality of different types of network interfaces, wherein each network interface of the plurality of different types of network interfaces is dedicated to a different type of communication protocol using a different encryption technique; and
initiating secure transmission of each respective message segment via the respective network interface selected for transmitting that respective message segment according to the pattern.

9. The computer readable storage device of claim 8, wherein an additional network interface is included in another communication device in communication with the communication device, and wherein selecting the respective network interface comprises selecting the respective network interface from among the plurality of different types of network interfaces included within the communication device and the additional network interface included within the other communication device according to the pattern.

10. The computer readable storage device of claim 9, wherein the additional network interface included in the other communication device is dedicated to another type of communication protocol using another encryption technique, wherein the other type of communication protocol and the other encryption technique are different than the type of communication protocol and the encryption technique to which each network interface included in the communication device is dedicated.

11. The computer readable storage device of claim 8, wherein the pattern is random, such that the respective network interface selected for transmitting each respective message segment is randomly selected.

12. The computer readable storage device of claim 8, wherein the pattern is a particular sequence, and the respective network interface selected for transmitting each respective message segment is selected in a particular order according to the particular sequence.

13. The computer readable storage device of claim 8, wherein there are multiple patterns of the plurality of different types of network interfaces, and the instructions further cause the processor to choose the pattern according to which the respective network interface for transmitting each respective message segment is selected from among the multiple patterns.

14. The computer readable storage device of claim 8, wherein the pattern according to which the respective network interface for transmitting each respective message segment is selected is renegotiated with a server that receives each respective message segment.

15. A method, comprising:
dividing a message into multiple message segments;
selecting a respective network interface from among a plurality of different types of network interfaces included within a communication device for transmitting each respective message segment of the multiple message segments according to a pattern of the plurality of different types of network interfaces, wherein each network interface of the plurality of different types of network interfaces is dedicated to a different type of communication protocol using a different encryption technique; and
initiating secure transmission of each respective message segment via the respective network interface selected for transmitting that respective message segment according to the pattern.

16. The method of claim 15, wherein an additional network interface is included in another communication device in communication with the communication device, the additional network interface included in the other communication device is dedicated to another type of communication protocol using another encryption technique, wherein the other type of communication protocol and the other encryption technique are different than the type of communication protocol and the encryption technique to which each network interface included in the communication device is dedicated, and selecting the respective network interface comprises selecting the respective network interface from among the plurality of different types of network interfaces included within the communication device and the additional network interface included within the other communication device according to the pattern.

17. The method of claim 15, wherein the pattern is random, such that the respective network interface selected for transmitting each respective message segment is randomly selected.

18. The method of claim 15, wherein the pattern is a particular sequence, and the respective network interface selected for transmitting each respective message segment is selected in a particular order according to the particular sequence.

19. The method of claim 15, wherein there are multiple patterns of the plurality of different types of network interfaces, and the method further comprises choosing the pattern according to which the respective network interface for transmitting each respective message segment is selected from among the multiple patterns.

20. The method of claim 15, wherein the pattern according to which the respective network interface for transmitting each respective message segment is selected is negotiated with a server that receives each respective message segment.

* * * * *